US007639650B2

(12) United States Patent
Cho et al.

(10) Patent No.: US 7,639,650 B2
(45) Date of Patent: Dec. 29, 2009

(54) APPARATUS AND METHOD FOR ALLOCATING OVSF CODES AND I/Q CHANNELS FOR REDUCING PEAK-TO-AVERAGE POWER RATIO IN TRANSMITTING DATA VIA ENHANCED UP-LINK DEDICATED CHANNELS IN WCDMA SYSTEMS

(75) Inventors: Joon-Young Cho, Suwon-si (KR);
Ju-Ho Lee, Suwon-si (KR);
Youn-Hyoung Heo, Suwon-si (KR);
Yong-Jun Kwak, Yongin-si (KR);
Young-Bum Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 747 days.

(21) Appl. No.: 11/057,618

(22) Filed: Feb. 14, 2005

(65) Prior Publication Data

US 2005/0213677 A1 Sep. 29, 2005

(30) Foreign Application Priority Data

| Feb. 14, 2004 | (KR) | .................. | 10-2004-0009821 |
| Feb. 20, 2004 | (KR) | .................. | 10-2004-0011565 |
| May 7, 2004 | (KR) | .................. | 10-2004-0032410 |
| Jun. 17, 2004 | (KR) | .................. | 10-2004-0045127 |
| Jul. 16, 2004 | (KR) | .................. | 10-2004-0055676 |
| Sep. 14, 2004 | (KR) | .................. | 10-2004-0073547 |
| Sep. 20, 2004 | (KR) | .................. | 10-2004-0075256 |
| Nov. 8, 2004 | (KR) | .................. | 10-2004-0090577 |
| Nov. 9, 2004 | (KR) | .................. | 10-2004-0091097 |
| Nov. 16, 2004 | (KR) | .................. | 10-2004-0093740 |

(51) Int. Cl.
*H04B 7/216* (2006.01)

(52) U.S. Cl. .................. 370/335; 370/342; 375/145

(58) Field of Classification Search .................. 375/140, 375/142, 145, 146, 147, 149; 370/328, 329, 370/335, 342

See application file for complete search history.

(56) References Cited

U.S. PATENT DOCUMENTS 7,443,906 B1 * 10/2008 Bang et al. .................. 375/140

(Continued)

FOREIGN PATENT DOCUMENTS

EP 1 248 485 10/2002

(Continued)

OTHER PUBLICATIONS

Samsung, "Par Results for Cases Maintaining Backward Compatibility", 3GPP TSG-RAN WG1 #36, Malaga, Spain, Feb. 16-20, 2004.

(Continued)

*Primary Examiner*—Nhan T Le
(74) *Attorney, Agent, or Firm*—The Farrell Law Firm, LLP

(57) ABSTRACT

An apparatus and method in which an Enhanced Uplink Dedicated transport CHannel (EUDCH) is used in a Wideband Code Division Multiple Access (WCDMA) system is provided. In a User Equipment (UE), when physical channels for transmitting EUDCH data are transmitted in addition to existing physical channels, a Peak-to-Average Power Ratio (PAPR) of an uplink transport signal increases. The increase in PAPR depends upon Orthogonal Variable Spreading Factor (OVSF) codes allocated to the corresponding physical channels and In-phase/Quadrature-phase (I/Q) channels. Therefore, the apparatus and method allocate optimum OVSF codes and I/Q channels to EUDCH-related physical channels in order to minimize an increase in PAPR due to EUDCH.

12 Claims, 5 Drawing Sheets

U.S. PATENT DOCUMENTS

| | | |
|---|---|---|
| 2002/0018457 A1 | 2/2002 | Choi et al. |
| 2002/0131381 A1* | 9/2002 | Kim et al. .................. 370/335 |
| 2003/0002472 A1 | 1/2003 | Choi et al. |
| 2003/0031119 A1 | 2/2003 | Kim et al. |
| 2003/0108025 A1 | 6/2003 | Kim et al. |
| 2004/0085924 A1 | 5/2004 | Zhang et al. |

FOREIGN PATENT DOCUMENTS

| | | |
|---|---|---|
| KR | 10-2003-55774 | 7/2003 |
| RU | 2 193 291 | 10/1997 |
| WO | WO 03/071707 | 8/2003 |
| WO | WO 2005/078965 | 8/2005 |

OTHER PUBLICATIONS

Motorola, "Par Results for Various Multiplexing Alternatives: Text Proposal", 3GPPRAN1#35, Lisbon, Portugal, Nov. 17-21, 2003.

$3^{rd}$ Generation Partnership Project; Technical Specification Group Radio Access Network FDD Enhanced Uplink; Physical Layer Aspects, (Release 6), Oct. 2004.

* cited by examiner

| Case # | 99.9% PAPR [dB] | I CHANNEL ||| Q CHANNEL |||
|---|---|---|---|---|---|---|---|
| | | PHYSICAL CHANNEL | OVSF CODE | $\beta$ | PHYSICAL CHANNEL | OVSF CODE | $\beta$ |
| 40 (PROPOSED METHOD) | 5.49 | E-DPCCH | 64, 1 | 30 | DPCCH | 256, 0 | 15 |
| | | DPDCH | 64, 16 | 15 | HS-DPCCH | 256, 64 | 30 |
| | | E-DPDCH1 | 4, 2 | 34 | E-DPDCH2 | 4, 2 | 34 |
| 41 | 6.19 | / | / | / | DPCCH | 256, 0 | 15 |
| | | DPDCH | 64, 16 | 15 | E-DPCCH | 64, 1 | 30 |
| | | E-DPDCH1 | 4, 2 | 34 | HS-DPCCH | 256, 64 | 30 |
| | | DPDCH | 64, 8 | 30 | E-DPDCH2 | 4, 2 | 34 |
| 42 | 5.61 | E-DPCCH | 64, 1 | 30 | DPCCH | 256, 0 | 15 |
| | | DPDCH | 64, 16 | 15 | HS-DPCCH | 256, 64 | 30 |
| | | E-DPDCH1 | 4, 2 | 34 | E-DPDCH2 | 4, 2 | 34 |

FIG.5

APPARATUS AND METHOD FOR ALLOCATING OVSF CODES AND I/Q CHANNELS FOR REDUCING PEAK-TO-AVERAGE POWER RATIO IN TRANSMITTING DATA VIA ENHANCED UP-LINK DEDICATED CHANNELS IN WCDMA SYSTEMS

PRIORITY

This application claims priority to applications entitled "Apparatus and Method for Allocating OVSF Codes and I/Q Channels for Reducing Peak-To-Average Power Ratio in Transmitting Data Via Enhanced Up-Link Dedicated Channels in WCDMA Systems", filed in the Korean Intellectual Property Office on Feb. 14, 2004, Feb. 20, 2004, May 7, 2004, Jun. 17, 2004, Jul. 16, 2004, Sep. 14, 2004, Sep. 20, 2004, Nov. 8, 2004, Nov. 9, 2004 and Nov. 16, 2004, and which were assigned Serial Nos. 9821/2004, 11565/2004, 32410/2004, 45127/2004, 55676/2004, 73547/2004, 75256/2004, 90577/2004, 91097/2004 and 93740/2004, respectively, the contents of each of which are incorporated herein by reference.

BACKGROUND OF THE INVENTION

1. Field of the Invention

The present invention relates generally to an asynchronous Wideband Code Division Multiple Access (WCDMA) communication system, and in particular, to an apparatus and method for minimizing an increase in Peak-to-Average Power Ratio (PAPR) of a transmission signal during data transmission through an Enhanced Uplink Dedicated Transport Channel (EUDCH).

That is, the present invention proposes an optimal Orthogonal Variable Spreading Factor (OVSF) code and In-phase/Quadrature-phase (I/Q) channel allocation apparatus and method for uplink physical channels for EUDCH service.

2. Description of the Related Art

Currently, an uplink of a WCDMA system includes a Dedicated Physical Data Channel (DPDCH) and a Dedicated Physical Control Channel (DPCCH) as typical dedicated physical channels used to transmit user signals. The DPDCH is a data transport channel over which user data such as voice and image data is transmitted, and the DPCCH is a control information transport channel on which DPDCH frame format information and pilot information for DPDCH demodulation and power control are carried.

Recently, technology using a EUDCH, which is an enhanced uplink data-only transport channel, has been proposed to improve a rate and efficiency of packet data transmission in an uplink.

FIG. 1 is a diagram illustrating information exchanged between user equipments and a Node B to perform uplink transmission.

Referring to FIG. 1, UEs 110, 112, 114 and 116 transmit packet data with varying transmission power according to their distances from a Node B 100. The UE 110 which is located the farthest from Node B 100 transmits packet data with the highest transmission power 120 for the uplink channel, while the UE 114 which is located in the nearest to the Node B 100, transmits the packet data with the lowest transmission power 124 for the uplink channel. To improve performance of the mobile communication system, the Node B 100 can perform scheduling such that a level of the transmission power for the uplink channel should be in reverse proportion to the data rate. That is, the Node B 100 allocates the lowest data rate to a UE having the highest transmission power for the uplink channel, and allocates the highest data rate to a UE having the lowest transmission power for the uplink channel.

FIG. 2 is a diagram illustrating information exchanged between a UE and a Node B to perform uplink transmission. That is, FIG. 2 illustrates a basic procedure required between a Node B 200 and a UE 202 for packet data transmission through an EUDCH.

Referring to FIG. 2, in step 210 involving a process of transmitting/receiving messages through a dedicated transport channel, a EUDCH is set up between the Node B 200 and the UE 202. In step 212, the UE 202 transmits information regarding a desired data rate and information estimating an uplink channel condition to the Node B 200. The information estimating an uplink channel condition includes transmission power of an uplink channel transmitted by the UE 202 and a transmission power margin of the UE 202.

Node B 200, which receives the uplink channel transmission power, can estimate a downlink channel condition by comparing the uplink channel transmission power with reception power. That is, Node B 200 considers that an uplink channel condition is fair if a difference between the uplink channel transmission power and the uplink channel reception power is small, and considers that the uplink channel condition is poor if the difference between the transmission power and the reception power is high. When the UE 202 transmits transmission power margin to estimate an uplink channel condition, Node B 200 can estimate the uplink transmission power by subtracting the transmission power margin from the known possible maximum transmission power for the UE 202. Node B 200 determines the maximum data rate for an uplink packet channel of the UE 202 using the estimated channel condition of the UE 202 and information on a data rate required by the UE 202.

The maximum data rate is notified to the UE 202 in step 214. The UE 202 determines a data rate for transmission packet data within a range of the notified possible maximum data rate, and in step 216, transmits the packet data to the Node B 200 at the determined data rate.

Herein, uplink physical channels supporting the EUDCH service include a Dedicated Physical Data CHannel (DPDCH), a Dedicated Physical Control Channel (DPCCH), a High-Speed Dedicated Physical Control CHannel (HS-DPCCH) for High-Speed Downlink Packet Access (HSDPA) service, an Enhanced Dedicated Physical Data Channel (E-DPDCH) for the EUDCH service, and an Enhanced Dedicated Physical Control CHannel (E-DPCCH) for the EUDCH service.

That is, in step 216, the UE 202 transmits an E-DPCCH to provide frame format and channel coding information of the E-DPDCH channel, and transmits packet data through the E-DPDCH. Herein, the E-DPCCH can also be used for transmission of an uplink data rate required by the UE 202 and transmission power margin, and transmission of pilot information required by the Node B 200 for demodulation of the E-DPDCH.

If the UE 202 transmits separate physical channels in addition to the existing physical channels in order to transmit EUDCH packet data as described above, the number of physical channels transmitted in the uplink increases, causing an increase in a Peak-to-Average Power Ratio (PAPR) of an uplink transmission signal. Generally, the PAPR increases as the number of simultaneously transmitted physical channels increases.

Since the increase in the PAPR may increase distortion of transmission signals and an allowed Adjacent Channel Leakage power Ratio (ACLR), a Radio Frequency (RF) power amplifier in a UE requires power back-off which reduces amplifier's input power to prevent the foregoing problem. If the UE performs power back-off, the result is a reduction in reception power at a receiver in a Node B, causing an increase in error rate of the received data or a reduction in cell coverage.

Accordingly, in order to prevent the increase in PAPR, the UE intends to transmit the EUDCH over the existing physical channel such as a DPDCH on a time division basis, instead of transmitting the EUDCH on a separate physical channel. However, the process of transmitting the EUDCH over the existing physical channel on a time division basis increases implementation complexity.

As a result, a WCDMA system has proposed a method for multiplying the physical channels by Orthogonal Vector Spreading Factor (OVSF) codes satisfying mutual orthogonality before transmission in the uplink. The physical channels multiplied by the OVSF codes can be distinguished in a Node B.

FIG. 3 is a diagram illustrating a tree structure for OVSF codes commonly used in a WCDMA system.

Referring to FIG. 3, the OVSF codes can be simply generated in a calculation process shown in Equation (1) to Equation (3).

$$C_{ch,1,0} = 1. \quad \text{Equation (1)}$$

$$\begin{bmatrix} C_{ch,2,0} \\ C_{ch,2,1} \end{bmatrix} = \begin{bmatrix} C_{ch,1,0} & C_{ch,1,0} \\ C_{ch,1,0} & -C_{ch,1,0} \end{bmatrix} = \begin{bmatrix} 1 & 1 \\ 1 & -1 \end{bmatrix}. \quad \text{Equation (2)}$$

$$\begin{bmatrix} C_{ch,2^{(n+1)},0} \\ C_{ch,2^{(n+1)},1} \\ C_{ch,2^{(n+1)},2} \\ C_{ch,2^{(n+1)},3} \\ \vdots \\ C_{ch,2^{(n+1)},2^{(n+1)}-2} \\ C_{ch,2^{(n+1)},2^{(n+1)}-1} \end{bmatrix} = \begin{bmatrix} C_{ch,2^n,0} & C_{ch,2^n,0} \\ C_{ch,2^n,0} & C_{ch,2^n,0} \\ C_{ch,2^n,1} & C_{ch,2^n,1} \\ C_{ch,2^n,1} & C_{ch,2^n,1} \\ \vdots & \vdots \\ C_{ch,2^n,2^n-1} & C_{ch,2^n,2^n-1} \\ C_{ch,2^n,2^n-1} & C_{ch,2^n,2^n-1} \end{bmatrix}. \quad \text{Equation (3)}$$

As illustrated in FIG. 3, orthogonality is secured between the OVSF codes having the same spreading factor (SF). In addition, for two codes having different SF values, if a code having a larger SF value cannot be generated from a code having a lower SF value using Equation (3), orthogonality is acquired between the two codes.

A description thereof will be made by way of the following example.

For SF=4, $C_{ch,4,0}=(1,1,1,1)$ is orthogonal with $C_{ch,2,1}=(1,-1)$ but is not orthogonal with $C_{ch,2,0}=(1,1)$.

As another example, comparing SF=256 OVSF codes with the $C_{ch,2,1}=(1,1)$, since OVSF codes with SF=0~127 are generated from the $C_{ch,2,1}=(1,1)$, orthogonality is not secured therebetween. That is, as a higher data rate is required, an OVSF code with a lower SF value is used, and when a plurality of physical channels are simultaneously transmitted, the OVSF codes should be allocated such that orthogonality is secured therebetween.

Although two physical channels use the same OVSF code, if they are separately transmitted through an I channel and a Q channel of a transmitter, a receiver can separate the two physical channel signals without mutual interference and demodulate the separated physical channel signals, because the signals transmitted on the I channel and the Q channel are carried by carriers having a 90°-phase difference.

As described above, an increase in uplink PAPR depends on the number of physical channels simultaneously transmitted in the uplink, a power ratio between physical channels, an OVSF code used for each physical channel, and I/Q channel allocation for each physical channel.

In the WCDMA system to which the EUDCH technology is applied, if E-DPCCH and E-DPDCH channels for transmission of EUDCH packet data are simultaneously transmitted in addition to the uplink channels, the PAPR increases undesirably.

SUMMARY OF THE INVENTION

It is, therefore, an aspect of the present invention to provide a UE's transmission apparatus and method for efficiently transmitting packet data through an enhanced uplink in a mobile communication system.

It is another aspect of the present invention to provide an OVSF code and I/Q channel allocation apparatus and method for minimizing an increase in PAPR of an uplink transmission signal in a mobile communication system supporting an uplink.

It is a further aspect of the present invention to provide an apparatus and method for allocating I/Q channels and OVSF codes for E-DPDCHs and an E-DPCCH to minimize an increase in PAPR according to presence/absence of an HS-DPCCH and the number of codes for DPDCHs.

In accordance with one aspect of the present invention, there is provided a method for transmitting packet data in a mobile communication system supporting transmission of enhanced uplink packet data, including generating a DPCCH using an OVSF code (256, 0) and a Quadrature phase (Q) channel; generating a DPDCH using an OVSF code ($SF_{DPDCH}$, $SF_{DPDCH}/4$) and an in-phase (I) channel, where $SF_{DPDCH}$ denotes a spreading factor of the DPDCH, generating an E-DPCCH using an OVSF code ($SF_{E-DPCCH}$, 1) and the I channel, where $SF_{E-DPCCH}$ denotes a spreading factor of an OVSF code to be allocated to an E-DPCCH for supporting transmission of enhanced uplink packet data, generating an E-DPDCH using an OVSF code ($SF_{E-DPDCH}$, $SF_{E-DPDCH}/2$) and the Q channel, where $SF_{E-DPDCH}$ denotes a spreading factor (SF) value of an OVSF code to be allocated to an E-DPDCH and the $SF_{E-DPDCH}$ is larger than 4, forming one complex symbol stream by summing the generated I and Q channels and scrambling the complex symbol stream, and transmitting the scrambled complex symbol stream through an antenna.

In accordance with another aspect of the present invention, there is provided a method for transmitting uplink packet data in a mobile communication system supporting transmission of enhanced uplink packet data, including generating dedicated physical channels and a dedicated physical control channel for supporting a high speed downlink packet service using OVSF codes, generating dedicated physical channels for transmission of enhanced uplink packet data using OVSF codes unused by the physical channels, forming one complex symbol stream by summing an I channel and a Q channel of the generated channels and scrambling the complex symbol stream, and transmitting the scrambled complex symbol stream through an antenna.

BRIEF DESCRIPTION OF THE DRAWINGS

The above and other objects, features and advantages of the present invention will become more apparent from the following detailed description when taken in conjunction with the accompanying drawings in which:

FIG. 5 is a diagram illustrating a PAPR comparison result between physical channels according to the present invention.

DETAILED DESCRIPTION OF THE PREFERRED EMBODIMENTS

Figure 1:
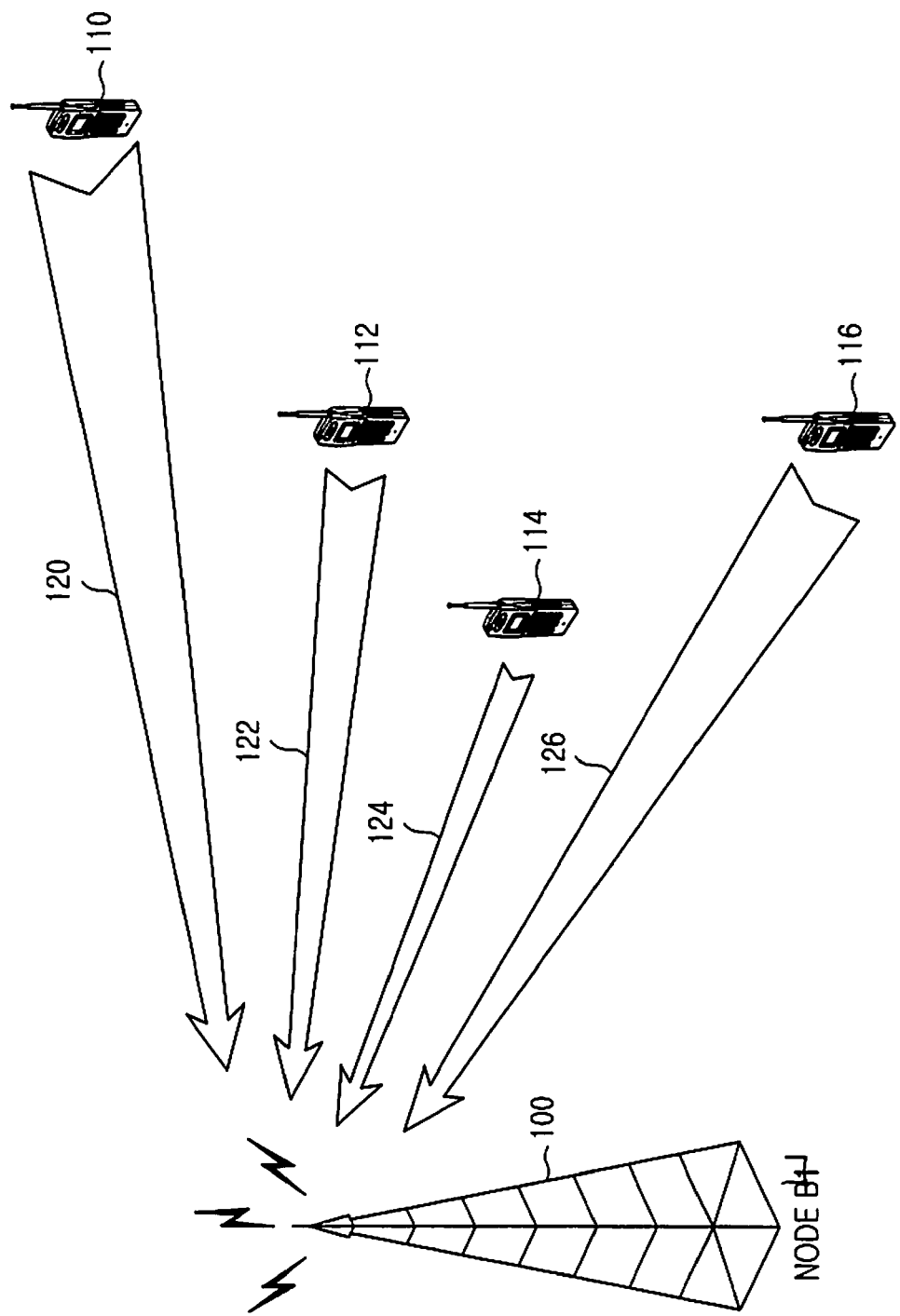
FIG. 1 is a diagram illustrating UEs performing uplink transmission and a Node B.
Figure 2:
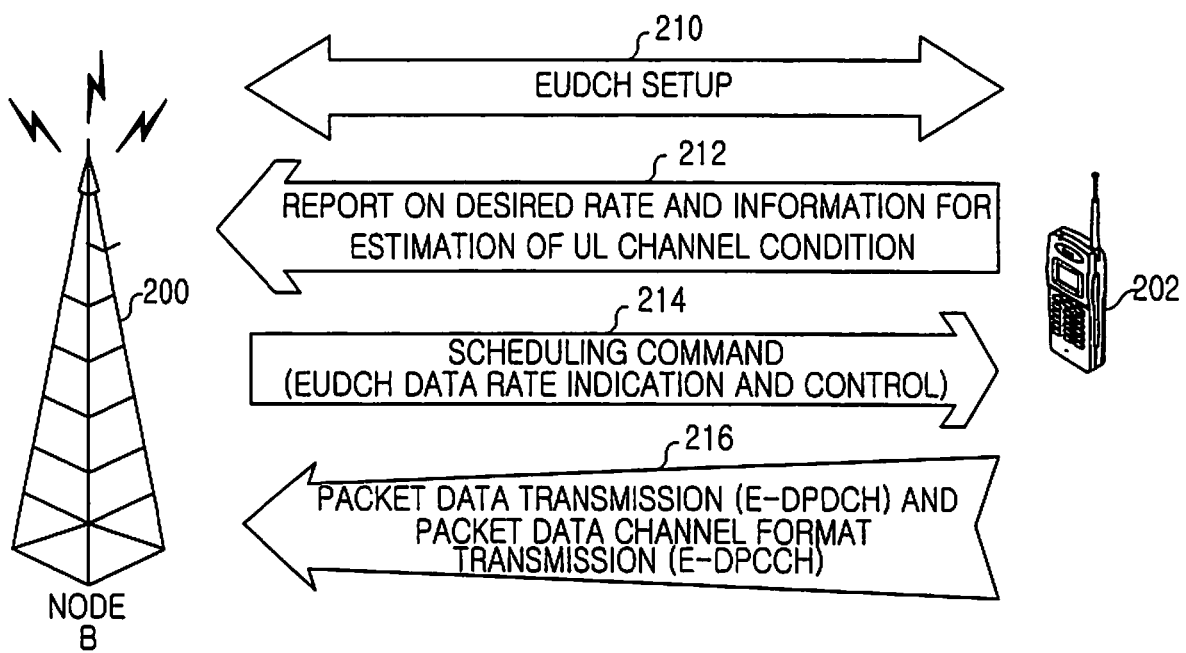
FIG. 2 is a diagram illustrating information exchanged between a UE and a Node B to perform uplink transmission.

Several preferred embodiments of the present invention will now be described in detail with reference to the annexed drawings. In the following description, a detailed description of known functions and configurations incorporated herein has been omitted for the sake of clarity and conciseness.

The present invention provides an OVSF code and I/Q channel allocation method for minimizing an increase in PAPR of an uplink transmission signal in a WCDMA system supporting EUDCH data service. That is, the present invention provides an OVSF code and I/Q channel allocation method optimized for the case where an E-DPCCH control channel and an E-DPDCH data channel, for transmission of EUDCH packet data, are transmitted in addition to the existing physical channels. In order to increase an EUDCH data rate and minimize an increase in PAPR, the present invention provides an OVSF code and I/Q channel allocation method for minimizing the PAPR increase while maintaining orthogonality between the existing DPCCH, DPDCH and HS-DPCCH.

In the existing Rel-5 WCDMA standard, OVSF code and I/Q channel allocation for an HS-DPCCH channel is achieved so as to reduce a PAPR considering the maximum number of transmittable DPDCHs, determined during setup of a radio link between a UE and a Node B.

Therefore, OVSF code and I/Q channel allocation for an E-DPDCH and an E-DPCCH, proposed in the present invention, is achieved considering the maximum number of DPDCHs transmittable in the radio link and transmission/non-transmission of an HS-DPCCH, for the Rel-5 physical channels. In the EUDCH service, several E-DPDCH physical channels can be simultaneously transmitted since they support high-data rate transmission. However, transmission of a single E-DPCCH is generally sufficient.

That is, in order to reduce a PAPR increase of an uplink transmission signal, the present invention supports an EUDCH considering backward compatibility with the existing WCDMA system. This because serious problems may occur in initial call setup or handover processes when Node Bs have inconsistent versions due to incompatibility for DPDCH and DPCCH standard.

In other words, the present invention provides an OVSF code and I/Q channel allocation method optimized to minimize the PAPR increase for EUDCH-related physical channels while maintaining the existing Rel-5 WCDMA standard for the DPDCH and the DPCCH core uplink physical channels.

First, assuming that the existing uplink channels undergo OVSF code and I/Q channel allocation as defined in the current standard in an OVSF code and I/Q channel allocation method by maintaining full compatibility with the existing Rel-5 WCDMA system, the present invention provides an OVSF code and I/Q channel allocation method optimized for the case where an E-DPCCH and an E-DPDCH for transmission of EUDCH packet data are additionally transmitted.

Second, the case where compatibility with the HS-DPCCH is partially lost while compatibility with the existing DPDCH and DPCCH is maintained will be taken into consideration. In the current Rel-5 WCDMA standard, if the maximum number of transmittable DPDCHs is one, the HS-DPCCH is transmitted on a Q channel using an OVSF code (256, 64). In this case, because an E-DPDCH cannot use an OVSF code (4, 1) on the Q channel, a maximum EUDCH data rate is limited accordingly. In order to solve the problem, the present invention provides a code allocation rule for the HS-DPCCH, E-DPCCH and E-DPDCH so as to enable the E-DPDCH to use the OVSF code (4, 1) on the Q channel and reduce a PAPR of a UE's transmission signal.

Third, in an Rel-6 standard, even a EUDCH stand-alone case in which no DPDCH is transmitted and only the E-DPDCH is transmitted in the uplink is taken into consideration. Therefore, the present invention presents an OVSF code and I/Q channel allocation rule for the HS-DPCCH for the EUDCH stand-alone case.

In the foregoing methods, I/Q channel and OVSF code allocation for the HS-DPCCH depends on the maximum number of transmittable DPDCH channels, and the number of E-DPDCH channels does not affect the allocation rule for the HS-DPCCH. This is because the E-DPDCH is transmitted only when there is data in an EUDCH data buffer of a UE. Therefore, in terms of a PAPR, an OVSF code and I/Q channel allocation rule are preferably defined for the HS-DPCCH considering only the DPDCH according to the current standard.

Figure 4:
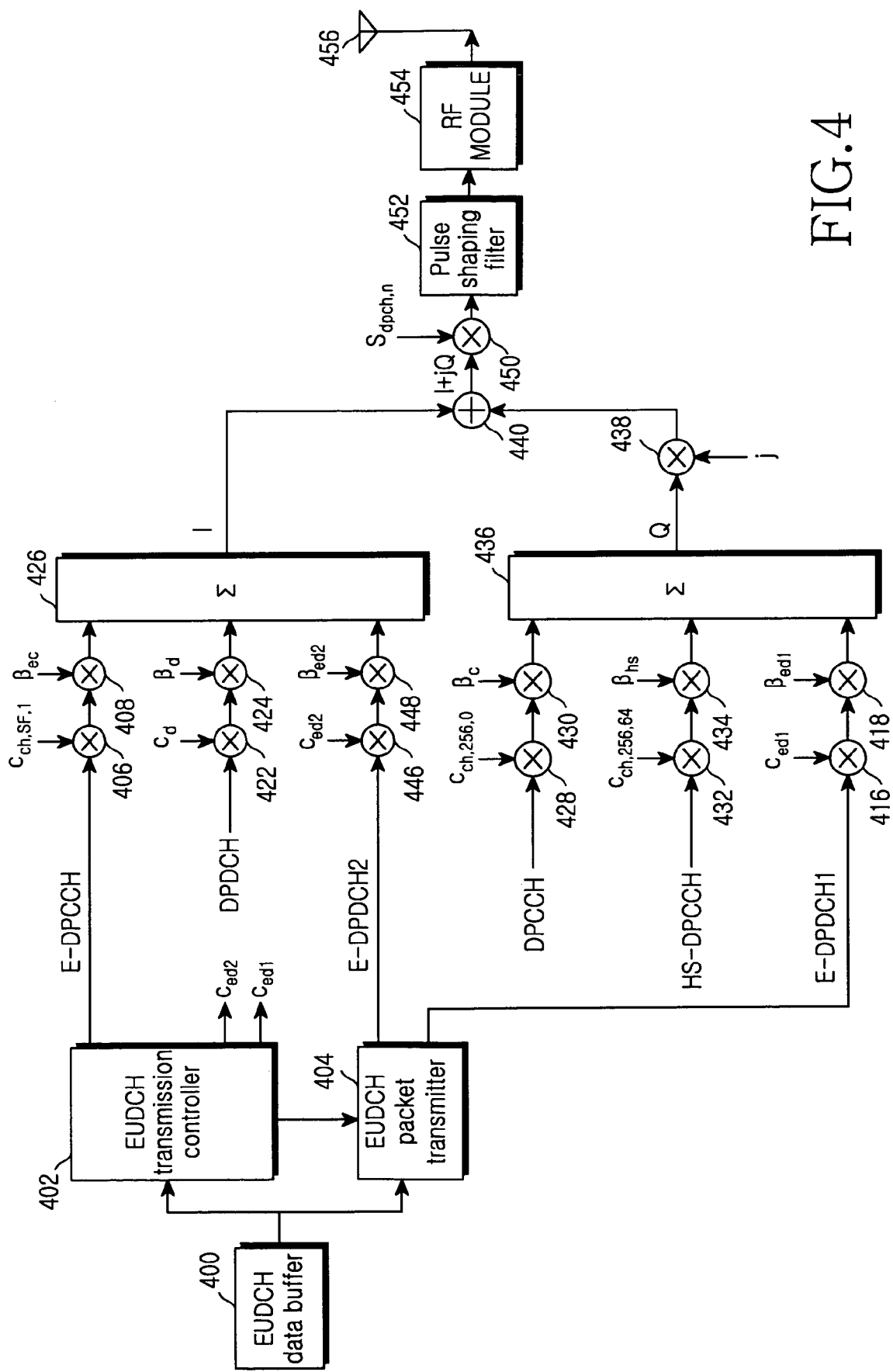
FIG. 4 is a diagram illustrating a transmitter structure of a UE according to the present invention.

FIG. 4 is a diagram illustrating a transmitter structure of a UE according to the present invention.

1. DPCCH

Figure 3:
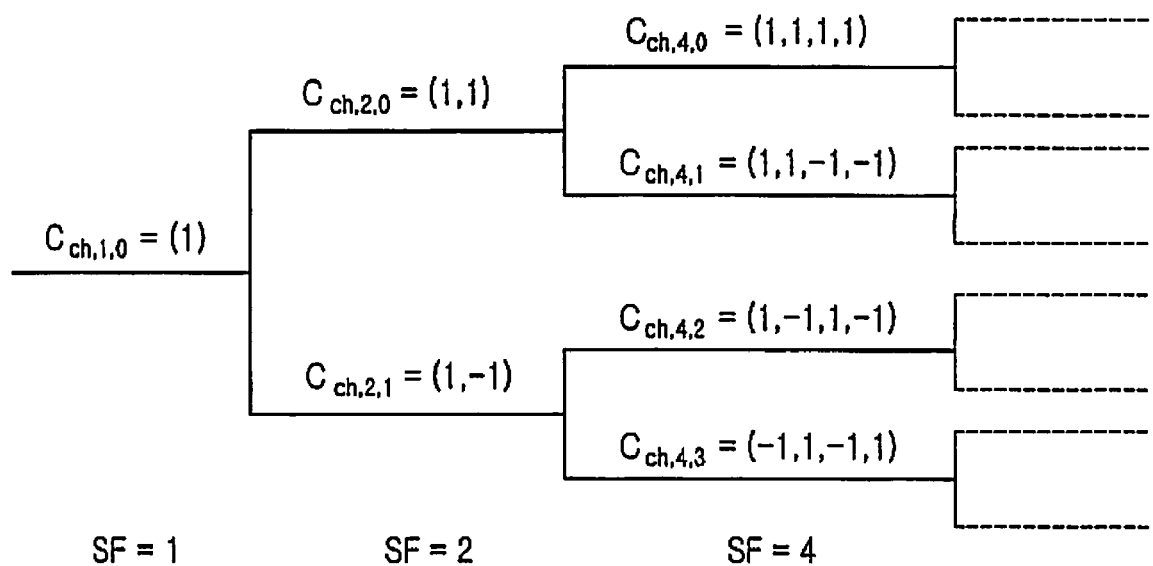
FIG. 3 is a diagram illustrating a tree structure for general OVSF codes.

A DPCCH is allocated an OVSF code (256, 0) on a Q channel according to the existing Rel-99 and Rel-5 channel allocation rules. The (256, 0) is equal to an OVSF code $C_{ch,256,0}$ illustrated in FIG. 3. That is, in FIG. 4, the DPCCH is multiplied by the OVSF code $C_{ch,256,0}$ for spreading after being BPSK-modulated, and then multiplied by a transmission gain $\beta_c$. The $\beta_c$ is set by a network according to a rate or a required quality-of-service level of data transmitted by a UE.

The DPCCH signal is added to other channel signals transmitted through a Q channel, multiplied by a scrambling code $S_{dpch,n}$, and then transmitted via an antenna through a transmission pulse forming filter and an RF stage.

2. DPDCH

According to the channel allocation rule defined in the existing standard, if an SF value of a DPDCH is denoted by $SF_{DPDCH}$, the DPDCH is spread by an OVSF code ($SF_{DPDCH}$, $SF_{DPDCH}/4$) on an I channel. In FIG. 4, $c_d$ denotes an OVSF code for a DPDCH. In the present invention, it is assumed that when physical channels related to the EUDCH service are transmitted together with the DPDCH, only a maximum of one DPDCH channel is transmitted.

3. HS-DPCCH

Also, this follows the existing Rel-5 standard and is transmitted only when HSDPA service is achieved in a downlink. As can be seen in FIG. 4, when only one DPDCH is transmitted in the uplink, an HS-DPCCH is spread by an OVSF code (256, 64) on a Q channel.

4. E-DPCCH

An E-DPCCH, a physical control channel for EUDCH service, transmits a buffer state of a UE, or transmits uplink transmission power, uplink transmission power margin, and channel state information (CSI), which are required by a Node B to estimate an uplink channel condition. The E-DPCCH transmits a Transport Format and Resource Indicator (E-TFRI) for EUDCH service transmitted over the E-DPDCH.

If an SF value of an E-DPCCH is denoted by $SF_{E\text{-}DPCCH}$, the E-DPCCH is spread by an OVSF code ($SF_{E\text{-}DPCCH}$, 1) on an I channel. Herein, OVSF codes and I/Q channels are freely allocated to the E-DPCCH.

In a second method, the E-DPCCH uses an OVSF code ($SF_{E\text{-}DPCCH}$, 1) on a Q channel, unlike the DPCCH transmitted using an OVSF code (256, 1) on an I channel.

In a third method, the E-DPCCH is allocated to a Q channel when no DPDCH is set and an HS-DPCCH is set. In this case, an OVSF code ($SF_{E\text{-}DPCCH}$, 1) or ($SF_{E\text{-}DPCCH}$, $SF_{E\text{-}DPCCH}/8$) is suitable for the E-DPCCH.

In a fourth method, when no DPDCH is set, the E-DPCCH can be allocated to the Q channel regardless of whether the HS-DPCCH is set. In this case, either an OVSF code ($SF_{E\text{-}DPCCH}$, 1) or ($SF_{E\text{-}DPCCH}$, $SF_{E\text{-}DPCCH}/8$) is suitable for the E-DPCCH.

Such a rule is always available regardless of transmission/non-transmission of the HS-DPCCH and the number of E-DPDCH channels. In this case, 8, 16, 32, 64, 128 and 256 are available for the $SF_{E\text{-}DPCCH}$, and an $SF_{E\text{-}DPCCH}$ value to be used is determined considering the amount of information to be transmitted over the E-DPCCH.

In the case where no DPDCH is set and an HS-DPCCH is set for an I channel (256, 1), even if $SF_{E\text{-}DPCCH}=256$, the E-DPCCH cannot be allocated ($SF_{E\text{-}DPCCH}$, 1). Therefore, the E-DPCCH cannot be allocated for I channels ($SF_{E\text{-}DPCCH}$, 2) to ($SF_{E\text{-}DPCCH}$, $SF_{E\text{-}DPCCH}/8$). That is, allocating the E-DPCCH for the I channels ($SF_{E\text{-}DPCCH}$, 2) to ($SF_{E\text{-}DPCCH}$, $SF_{E\text{-}DPCCH}/8$) is most efficient in achieving a low PAR value. Herein, 32, 64, 128 and 256 are available for the $SF_{E\text{-}DPCCH}$.

Referring to FIG. 4, an EUDCH transmission controller 402 transmits control information through the E-DPCCH, which is required by a Node B to receive an E-DPDCH. In FIG. 4, $c_{ch,SF,1}$ denotes an OVSF code for the E-DPCCH, and is multiplied by a transmission symbol so that the corresponding channel is orthogonal with other physical channels. In addition, a transmission gain $\beta_{E\text{-}DPCCH}$ of the E-DPCCH, like those of other physical channels, is set according to a rate of a required quality-of-service level of data transmitted by a UE.

5. E-DPDCH

An E-DPDCH transmits EUDCH packet data using a data rate determined based on scheduling information provided from the Node B. The E-DPDCH supports not only BPSK but also QPSK and 8PSK in order to increase a data rate while maintaining the number of simultaneously transmitted spreading codes.

Referring back to FIG. 4, the E-DPDCH simultaneously transmits two channels of an E-DPDCH1 and an E-DPDCH2. Herein, the number of E-DPDCH physical channels in use depends on a transfer rate of EUDCH packet data. In addition, the EUDCH transmission controller 402 determines the number of simultaneously transmitted E-DPDCH channels and an SF value.

In other words, when a data rate is low, an E-DPDCH is spread with an OVSF code having a relatively large SF value so that it can be transmitted with one E-DPDCH. However, when a data rate is high, an $SF_{E\text{-}DPCCH}$ value is set to 4 or 2 so that EUDCH packet data is transmitted through one or two E-DPDCH channels.

That is, an EUDCH packet transmitter 404 transmits EUDCH transmission data through an E-DPDCH1 under the control of the EUDCH transmission controller 402. Alternatively, the E-DPDCH2 is allocated for the transmission when necessary. An EUDCH data buffer 400 is a buffer for storing EUDCH data to be transmitted. The EUDCH data to be transmitted through the E-DPDCH channels is delivered to the EUDCH packet transmitter 404 under the control of the EUDCH transmission controller 402.

A description will now be made of methods for allocating OVSF codes and I/Q channels for E-DPDCHs according to several embodiments of the present invention.

First Embodiment

A first embodiment provides methods for allocating OVSF codes and I/Q channels for the E-DPDCHs without considering DPDCHs. The proposed methods can reduce a PAPR by appropriately adjusting the minimum spreading gain value for E-DPDCHs and the number of transmission channels according to an EUDCH data rate. Herein, for convenience of description, the methods will be divided into Method A, Method B and Method C considering an $SF_{E\text{-}DPDCH}$ set based on a data rate.

Method A.

Method A corresponds to a case where an $SF_{E\text{-}DPDCH}$ for E-DPDCHs is set to 4 or larger.

1. One E-DPDCH Channel Transmitted

An E-DPDCH1 transmits EUDCH transmission symbols through a Q channel using an OVSF code ($SF_{E\text{-}DPDCH}$, $SF_{E\text{-}DPDCH}/2$). Herein, 4, 8, 16, 32, 64, 128 and 256 are available for the $SF_{E\text{-}DPDCH}$. In FIG. 4, $c_{ed1}$ denotes an OVSF code used for the E-DPDCH1. The E-DPDCH1 allocated an OVSF code in this manner satisfies orthogonality with other physical channels. That is, compared with a DPDCH transmitted on an I channel, the E-DPDCH1 can reduce its PAPR as it is transmitted on the Q channel.

2. Two E-DPDCH Channels Transmitted

When an $SF_{E\text{-}DPDCH}$ for an E-DPDCH1 and an E-DPDCH2 is 4, the E-DPDCH1 and the E-DPDCH2 are spread with an OVSF code (4, 2) and then simultaneously transmitted through a Q channel and an I channel, respectively. That is, the E-DPDCH1 is allocated to the Q channel, and the E-DPDCH2 is allocated to the I channel. Herein, the EUDCH packet data is transmitted with a modulation scheme having a $4^{th}$ order or higher, such as QPSK, 8PSK and 16QAM.

For example, when QPSK modulation is used, symbols transmitted through the E-DPDCH1 and the E-DPDCH2 are transmitted in four possible combinations of ($\pm 1$, $\pm 1$), and when 8PSK is used, symbols transmitted through the E-DPDCH1 and the E-DPDCH2 are transmitted in eight possible combinations of ($\pm\sqrt{2}$, 0), (0, $\pm\sqrt{2}$) and ($\pm 1$, $\pm 1$).

If a desired EUDCH data rate cannot be achieved even though the two channels of the E-DPDCH1 and the E-DPDCH 2 are simultaneously transmitted using the $SF_{E\text{-}DPDCH}=4$, it is possible to enable transmission at a higher data rate by setting the $SF_{E\text{-}DPDCH}$ to 2. That is, if an $SF_{E\text{-}DPDCH}$ for the E-DPDCH1 and the E-DPDCH2 is 2, the E-DPDCH1 and the E-DPDCH2 are spread with an OVSF code (2,1) and then simultaneously transmitted on a Q channel and an I channel, respectively.

When it is necessary to transmit several E-DPDCH physical channels in this manner, it is possible to significantly reduce a PAPR by halving the number of E-DPDCH channels being transmitted, as compared with the case where the minimum spreading gain is 4.

Method B.

Method B is similar to Method A described above, but allocates OVSF codes such that when only an E-DPDCH1 is transmitted, $SF_{E-DPDCH}$ is set to a minimum of 2.

1. One E-DPDCH Channel Transmitted

When only the E-DPDCH1 is transmitted, 2, 4, 8, 16, 32, 64, 128 and 256 are available for the $SF_{E-DPDCH}$. The E-DPDCH1 is allocated to a Q channel using an OVSF code ($SF_{E-DPDCH}$, $SF_{E-DPDCH}/2$)

2. Two E-DPDCH Channels Transmitted

The E-DPDCH1 and the E-DPDCH2 are spread with an OVSF code (2, 1) and then simultaneously transmitted on a Q channel and an I channel, respectively. In this case, EUDCH packet data is transmitted with a modulation scheme having a $4^{th}$ order or higher, such as QPSK, 8PSK and 16QAM.

Method C.

Method C is similar to Method A described above, but allocates OVSF codes such that $SF_{E-DPDCH}$ for the E-DPDCH1 is set to 2 and $SF_{E-DPDCH}$ for the E-DPDCH2 is set to 4, if a desired EUDCH data rate cannot be achieved even though the E-DPDCH1 and the E-DPDCH2 are simultaneously transmitted using the $SF_{E-DPDCH}=4$.

1. One E-DPDCH Channel Transmitted

When an $SF_{E-DPDCH}$ for E-DPDCHs is 4 or larger, EUDCH transmission symbols are transmitted through a Q channel using an OVSF code ($SF_{E-DPDCH}$, $SF_{E-DPDCH}/2$). Herein, 4, 8, 16, 32, 64, 128 and 256 are available for the $SF_{E-DPCCH}$.

2. Two E-DPDCH Channels Transmitted

When an $SF_{E-DPDCH}$ for the E-DPDCH1 and the E-DPDCH2 is 4, the E-DPDCH1 and the E-DPDCH2 are spread with an OVSF code (4, 2) and then simultaneously transmitted through a Q channel and an I channel, respectively. If a desired EUDCH data rate cannot be achieved even though the E-DPDCH1 and the E-DPDCH2 are simultaneously transmitted, an $SF_{E-DPDCH}$ for the E-DPDCH1 and an $SF_{E-DPDCH}$ for the E-DPDCH2 are set to different values.

That is, as an $SF_{E-DPDCH}$ for the E-DPDCH1 is set to 2 and an $SF_{E-DPDCH}$ for the E-DPDCH2 is set to 4, data carried on the respective channels independently undergoes BPSK modulation before being transmitted. Therefore, symbols transmitted on the E-DPDCH1 and the E-DPDCH2 are spread with OVSF codes (2, 1) and (4, 2) on a Q channel and an I channel, respectively, before being transmitted.

In addition, when a data rate cannot be achieved in the foregoing manner, the $SF_{E-DPDCH}$ for the E-DPDCH1 is set to 2 and the $SF_{E-DPDCH1}$ for the E-DPDCH2 is set to 2 for transmission. That is, the E-DPDCH1 and the E-DPDCH2 are spread with an OVSF code (2, 1) and then simultaneously transmitted on the I channel and the Q channel, respectively. In this case, the EUDCH packet data can be transmitted with a modulation scheme having a $4^{th}$ order or higher, such as QPSK, 8PSK and 16QAM.

Method D.

Method D is for allocating an OVSF code (4, 1) to an additional E-DPDCH to increase an EUDCH packet data rate when a DPDCH and an HS-DPCCH are not transmitted or when an OVSF code generated from an OVSF code (4, 0) is used even though the HS-DPCCH is transmitted. This is because the HS-DPCCH is transmitted only for the HSDPA service. A further reason is because when there is no data to be transmitted over a DPDCH, the DPDCH is occasionally used only for transmission of signaling information and may not be transmitted at another time. In the post-Rel-5 WCDMA standard, a case may exist where the DPDCH is not set and only the E-DPDCH is set.

1. Two or Fewer E-DPDCH Channels Transmitted

The foregoing Method A, Method B, or Method C can be used.

2. Three E-DPDCH Channels Transmitted

When an HS-DPCCH is not transmitted, an E-DPDCH3 channel is transmitted through a Q channel using an OVSF code (4, 1).

Alternatively, when the HS-DPCCH is transmitted and the DPDCH is not transmitted, the E-DPDCH3 channel is transmitted through an I channel using the OVSF code (4, 1).

3. Four or More E-DPDCH Channels Transmitted

The I channel and the Q channel both use the OVSF code (4, 1) for transmission. This is applied when the OVSF code (4, 1) is not used by the DPDCH and the HS-DPCCH.

In other words, when both of the HS-DPCCH and the DPDCH are not transmitted, third and fourth E-DPDCH channels are transmitted through the I channel and the Q channel using the OVSF code (4, 1), respectively. Even when the DPDCH is not set and the HS-DPCCH is transmitted using an OVSF code generated from the OVSF code (4, 0), the OVSF code (4, 1) is never used in the I and Q channels. Therefore, it is possible to transmit the third and fourth E-DPDCH channels on the I/Q channels using the OVSF code (4, 1).

Second Embodiment

A second embodiment provides methods for applying an OVSF code and I/Q channel allocation rule for the E-DPDCH differently, considering setup/non-setup of an HS-DPCCH.

The second embodiment provides a method for first allocating an E-DPDCH to an I channel when the HS-DPCCH is set for an OVSF code (256, 64) in a Q channel, thereby reducing a PAPR. The second embodiment can significantly reduce a PAPR when an HS-DPCCH has higher power than that of a DPDCH as a UE is located in the vicinity of a cell boundary.

When the HS-DPCCH is not set, OVSF codes are allocated in the following method.

Method A.

1. One E-DPDCH Transmitted

An E-DPDCH transmits EUDCH transmission symbols on a Q channel using an OVSF code ($SF_{E-DPDCH}$, $SF_{E-DPDCH}/4$). Herein, 4, 8, 16, 32, 64, 128, 256 and 512 are available for the $SF_{E-DPDCH}$.

If an EUDCH data rate cannot be fully achieved even though the $SF_{E-DPDCH}=4$ is used, the E-DPDCH uses on the Q channel an OVSF code (2, 1) with $SF_{E-DPDCH}=2$ instead of its OVSF code ($SF_{E-DPDCH}$, $SF_{E-DPDCH}/4$).

2. Two E-DPDCHs Transmitted

When an $SF_{E-DPDCH}$ for E-DPDCHs is set to 2, an E-DPDCH1 is transmitted on a Q channel using an OVSF code (2, 1), and an E-DPDCH2 is transmitted on an I channel using an OVSF code (2, 1).

Alternatively, the E-DPDCH1 is transmitted on the Q channel using an OVSF code (2, 1), and the E-DPDCH2 is transmitted on the I channel using an OVSF code (4, 2). In this case, if a desired EUDCH data rate cannot be achieved, an $SF_{E-DPDCH}$ for the E-DPDCH2 is set to 2 and an OVSF code (2, 1) is used instead of the OVSF code (4, 2) for transmission of the E-DPDCH2.

3. Three E-DPDCHs Transmitted

When an E-DPDCH1 is transmitted on a Q channel using an OVSF code (2, 1) and an E-DPDCH2 is transmitted on an I channel using an OVSF code (2, 1), an E-DPDCH3 is transmitted on the Q channel using an OVSF code (4, 1).

4. Four E-DPDCHs Transmitted

An E-DPDCH4 is transmitted on an I channel using an OVSF code (4, 1).

Herein, the case where an OVSF code (4, 1) can be used on both the I channel and the Q channel corresponds to the case where the OVSF code (4, 1) is unused by a DPDCH and an HS-DPCCH. That is, in the case where no DPDCH is set, or in the case where a DPDCH is equal to an E-DPDCH in radio frame length even though the DPDCH is set, an E-DPDCH4 is transmitted on an I channel using an OVSF code (4, 1) in addition to the E-DPDCH1, E-DPDCH2, and E-DPDCH3 in a transmission time interval (TTI) for which the DPDCH is not transmitted.

However, when an HS-DPCCH is set for (Q, 256, 64), an OVSF code allocation method is as follows.

Method B.

1. One E-DPDCH Transmitted

An E-DPDCH1 transmits EUDCH transmission symbols on an I channel using an OVSF code ($SF_{E-DPDCH}$, $SF_{E-DPDCH}/2$). Herein, 2, 4, 8, 16, 32, 64, 128, 256 and 512 are available for the $SF_{E-DPDCH}$.

2. Two E-DPDCHs Transmitted

An E-DPDCH1 is transmitted on an I channel using an OVSF code (2, 1), and an E-DPDCH2 is also transmitted on a Q channel using an OVSF code (2, 1).

Third Embodiment

A third embodiment uses the same OVSF code allocation method as that of the second embodiment when an HS-DPCCH is not set. However, when the HS-DPCCH is set for (Q, 256, 64), the following OVSF code allocation method is used.

1. One E-DPDCH Transmitted

An E-DPDCH1 uses ($SF_{E-DPDCH}$, $SF_{E-DPDCH}/2$) on a Q channel, and 2, 4, 8, 16, 32, 64, 128, 256 and 512 are available for the $SF_{E-DPDCH}$.

2. Two E-DPDCHs Transmitted

When an $SF_{E-DPDCH}$ for E-DPDCHs is set to 2, an E-DPDCH1 is transmitted on a Q channel using an OVSF code (2, 1), and an E-DPDCH2 is transmitted on an I channel using an OVSF code (2, 1).

Alternatively, the E-DPDCH1 is transmitted on the Q channel using an OVSF code (2, 1), and the E-DPDCH2 is transmitted on the I channel using an OVSF code (4, 2). In this case, if a desired EUDCH data rate cannot be achieved, an $SF_{E-DPDCH}$ for the E-DPDCH2 is set to 2 and an OVSF code (2, 1) is used instead of the OVSF code (4, 2) for transmission of the E-DPDCH2.

3. Three E-DPDCHs Transmitted

In the case where no DPDCH is set, or in the case where a DPDCH is equal to an E-DPDCH in radio frame length even though the DPDCH is set, an E-DPDCH3 is transmitted on a Q channel using an OVSF code (4, 1) in addition to the E-DPDCH1 and E-DPDCH2 transmitted on I and Q channels using an OVSF code (2, 1), in a TTI for which the DPDCH is not transmitted on the I channel.

Fourth Embodiment

A fourth embodiment provides a method for reducing a PAPR and efficiently using OVSF codes for the case where no DPDCH is set or the case where an E-DPDCH is equal to a DPDCH, even if it is set, in radio frame length, in the case where an HS-DPCCH is set for an OVSF code (256, 64) on a Q channel. An I/Q channel and OVSF code allocation method used for E-DPDCHs varies according to the presence or absence of DPDCHs transmitted in the current TTI.

1. One E-DPDCH Transmitted

When DPDCHs are transmitted in the current TTI, an E-DPDCH1 uses ($SF_{E-DPDCH}$, $SF_{E-DPDCH}/2$) on a Q channel, and 2, 4, 8, 16, 32, 64, 128, 256 and 512 are available for the $SF_{E-DPDCH}$.

However, when no DPDCH is transmitted in the current TTI, an OVSF code ($SF_{E-DPDCH}$, $SF_{E-DPDCH}/4$) is used on an I channel, and 4, 8, 16, 32, 64, 128, 256 and 512 are available for the $SF_{E-DPDCH}$. In this case, in order to further increase an EUDCH data rate, the E-DPDCH is transmitted using an OVSF code (2, 1) instead of the OVSF code ($SF_{E-DPDCH}$, $SF_{E-DPDCH}/4$).

2. Two E-DPDCHs Transmitted

When an $SF_{E-DPDCH}$ for E-DPDCHs is set to 2, an E-DPDCH1 is transmitted on a Q channel using an OVSF code (2, 1), and an E-DPDCH2 is transmitted on an I channel using an OVSF code (2, 1).

Alternatively, the E-DPDCH1 is transmitted on the Q channel using an OVSF code (2, 1), and the E-DPDCH2 is transmitted on the I channel using an OVSF code (4, 2). In this case, if a desired EUDCH data rate cannot be achieved, an $SF_{E-DPDCH}$ for the E-DPDCH2 is set to 2 and an OVSF code (2, 1) is used instead of the OVSF code (4, 2) for transmission of the E-DPDCH2.

3. Three E-DPDCHs Transmitted

In addition to the E-DPDCH1 and the E-DPDCH2 transmitted on the Q and I channels using the OVSF code (2, 1), an E-DPDCH is transmitted on the I channel using an OVSF code (4, 1) when no DPDCH is transmitted in the current TTI.

Fifth Embodiment

A fifth embodiment provides two methods for allocating E-DPDCHs when no DPDCH is set. For the E-DPDCHs, the fifth embodiment has a basic concept of allocating an E-DPDCH1 to opposite I/Q channels of the I/Q channels on which an HS-DPCCH is transmitted, and can reduce a PAPR when a channel gain factor for the HS-DPCCH is high.

Method A.

When the HS-DPCCH is not set, an E-DPDCH allocation method is as follows.

1. One E-DPDCH Transmitted

An E-DPDCH I transmits EUDCH transmission symbols on an I channel using an OVSF code ($SF_{E-DPDCH}$, $SF_{E-DPDCH}/4$). Herein, 4, 8, 16, 32, 64, 128, 256 and 512 are available for the $SF_{E-DPDCH}$. In this case, if a EUDCH data rate cannot be fully achieved even though the $SF_{E-DPDCH}$ is set to 4, the $SF_{E-DPDCH}$ is set to 2 and the EUDCH transmission symbols are transmitted on the I channel using an OVSF code (2, 1) instead of the OVSF code ($SF_{E-DPDCH}$, $SF_{E-DPDCH}/4$).

2. Two E-DPDCHs Transmitted

An E-DPDCH1 is transmitted on an I channel using an OVSF code (2, 1), and an E-DPDCH2 is transmitted on a Q channel using an OVSF code (2, 1).

3. Three or More E-DPDCHs Transmitted

In addition to the E-DPDCH1 and the E-DPDCH2, an E-DPDCH3 and an E-DPDCH4 transmit EUDCH transmission symbols on I and Q channels using an OVSF code (4, 1).

Method B.

However, when the DPDCH is not set and an HS-DPCCH is set, the HS-DPCCH is likely allocated for the I channel.

1. One E-DPDCH Transmitted

An E-DPDCH transmits EUDCH transmission symbols on a Q channel using an OVSF code ($SF_{E-DPDCH}$, $SF_{E-DPDCH}/4$).

Herein, 4, 8, 16, 32, 64, 128, 256 and 512 are available for the $SF_{E\text{-}DPDCH}$. If an EUDCH data rate cannot be fully achieved even though the $SF_{E\text{-}DPDCH}=4$ is used, the SF is set to 2 and the Q channel uses an OVSF code (2, 1).

2. Two E-DPDCHs Transmitted

An E-DPDCH1 is transmitted on a Q channel using an OVSF code (2, 1), and an E-DPDCH2 is transmitted on an I channel using an OVSF code (2, 1).

3. Three or More E-DPDCHs Transmitted

In addition to the E-DPDCH1 and the E-DPDCH2 transmitted on the Q and I channels using an OVSF code (2, 1), an E-DPDCH3 and an E-DPDCH4 additionally transmit EUDCH transmission symbols on both the I and Q channels using an OVSF code (4, 1).

Referring back to FIG. 4, the EUDCH transmission controller 402 transmits the UE's data buffer state and CSI, required for Node B's scheduling control, to the Node B through the E-DPCCH. The EUDCH transmission controller 402 determines an E-TFRI and transmits the determined E-TFRI to the Node B through the E-DPCCH. The E-TFRI is determined using a possible maximum data rate.

The EUDCH packet transmitter 404 receives packet data determined based on the E-TFRI from the EUDCH data buffer 400. The received packet data undergoes channel coding and modulation using the E-TFRI, and then is transmitted to the Node B through the E-DPDCH1 and E-DPDCH2 channels according to the present invention.

Data on the DPDCH is spread at a chip rate using an OVSF code $c_d$ in a multiplier 422, and multiplied by a channel gain $\beta_d$ in a multiplier 424. The DPDCH data multiplied by the channel gain $\beta_d$ is input to a summer 426.

Control information on an E-DPCCH is spread in a multiplier 406 at a chip rate using an OVSF code $c_{ch,SF,1}$, i.e., $(SF_{E\text{-}DPCCH}, 1)$, to maintain orthogonality with other physical channels. Thereafter, the output of the multiplier 406 is multiplied by a channel gain $\beta_{ec}$ in a multiplier 408. The E-DPCCH control information multiplied by the channel gain $\beta_{ec}$ is input to the summer 426.

Packet data provided from the EUDCH packet transmitter 404 is converted into a complex symbol stream I+jQ, and then delivered to a multiplier 446 and a multiplier 416 as I and Q channel components, respectively. The multiplier 446 spreads the packet data into an I channel component of a modulation symbol with an OVSF code $C_{ed2}$ at a chip rate. The output of the multiplier 446 is multiplied by a channel gain $\beta_{ed2}$ in a multiplier 448. The summer 426 forms an I channel by summing up the DPDCH data, the E-DPCCH control information, and the E-DPDCH2 data.

Control information on the DPCCH is spread in a multiplier 428 at a chip rate using an OVSF code (256, 0), i.e., $c_{ch,256,0}$, and then multiplied by a channel gain $\beta_c$ in a multiplier 430. The DPCCH control information multiplied by the channel gain $\beta_c$ is input to a summer 436.

Control information on the HS-DPCCH is spread in a multiplier 432 using an OVSF code (256, 64), i.e., $c_{ch,256,64}$, at a chip rate, and then multiplied by a channel gain $\beta_{hs}$ in a multiplier 434.

A Q channel component of an EUDCH packet data modulation symbol provided from the EUDCH packet transmitter 404 is spread in a multiplier 416 with an OVSF code $C_{ed1}$ at a chip rate. The output of the multiplier 416 is multiplied by a channel gain $\beta_{ed1}$ in a multiplier 418. The summer 436 forms a Q channel by summing up the DPCCH control information, the HS-DPCCH control information, and the E-DPDCH1 data. The output of the summer 436 is multiplied by an imaginary number j in a multiplier 438, and then delivered to a summer 440.

The summer 440 forms one complex symbol stream by summing up the output of the summer 426 and the output of the multiplier 438, and delivers the complex symbol stream to a multiplier 450. The multiplier 450 scrambles the complex symbol stream using a scrambling code $S_{dpch,1}$. The scrambled complex symbol stream is converted into a pulse signal by a pulse-shaping filter 452, and then delivered to the Node B via an antenna 456 through an RF module 454.

FIG. 5 is a diagram illustrating a comparison between physical channels in terms of a PAPR reduction effect by FIG. 4.

In FIG. 5, reference numeral 40 represents the case where a method of the present invention is used, and reference numerals 41 and 42 represent the cases where different OVSF codes or different I/Q channels are allocated for an E-DPCCH. Herein, the PAPR result has been obtained through simulation using the transmission pulse shaping filter 452 and the scrambling code, specified in the Rel-5 WCDMA standard, and the channel gain β is generally set under discussion of the EUDCH technique.

Referring to FIG. 5, the case 40 is superior to the case 41 in terms of a PAPR reduction effect by about 0.7 dB. In addition, the case 40 is superior to the case 42 in terms of a PAPR reduction effect by about 0.12 dB. That is, the OVSF code and I/Q channel allocation method for the E-DPCCH and the E-DPDCH can achieve a relatively low PAPR.

A description will now be made of an OVSF code and I/Q channel allocation method for an E-DPCCH and an E-DPDCH considering transmission/non-transmission of an HS-DPCCH when compatibility with the existing Rel-5 standard is maintained and at least one DPDCH is transmitted, according to sixth to ninth embodiments.

Sixth Embodiment

1. One or More DPDCHs being Transmittable and an HS-DPCCH not being Transmitted

A method of allocating I/Q channels and OVSF codes for a DPCCH and a DPDCH according to the current standard are illustrated in Table 1.

TABLE 1

| Channel | Allocation |
| --- | --- |
| DPCCH | (Q, 256, 0) |
| DPDCH | (I, SF, SF/4) |

That is, a DPCCH channel is transmitted on a Q channel using an OVSF code (256, 0), and a DPDCH can be allocated to an I channel with an OVSF code $(SF_{DPDCH}, SF_{DPDCH}/4)$. Here, 4, 8, 16, 32, 64, 128, 256 and 512 are available for the $SF_{DPDCH}$.

A method of allocating I/Q channels and OVSF codes for an E-DPCCH and E-DPDCHs in the present invention considering compatibility with the current standard of Table 1 is illustrated in Table 2.

TABLE 2

| Channel | Allocation |
| --- | --- |
| E-DPCCH | (I, $SF_{E\text{-}DPCCH}$, 1) |
| E-DPDCH1, E-DPDCH2, | (Q, SF, SF/4), (I, 4, 3) |
| E-DPDCH3, E-DPDCH4, | (Q, 4, 3), (I, 4, 2) |
| E-DPDCH5 | (Q, 4, 2) |

Here, 8, 16, 32, 64, 128 and 256 are available for the $SF_{E-DPCCH}$ for the E-DPCCH, and 4, 8, 16, 32, 64, 128, 256 and 512 are available for the $SF_{E-DPDCH}$ for the E-DPDCHs.

As illustrated in Table 2, if a maximum of 5 E-DPDCH channels can be transmitted and SF=4 is applied to an E-DPDCH1, the E-DPDCH1 is transmitted on a Q channel using an OVSF code (4, 1), and an E-DPDCH2 is transmitted on an I channel with an OVSF code (4, 3). In addition, an E-DPDCH3 is transmitted on a Q channel using an OVSF code (4, 3), and an E-DPDCH4 is transmitted on the I channel using an OVSF code (4, 2). Finally, an E-DPDCH5 is transmitted on the Q channel using an OVSF code (4, 2).

2. One or More DPDCHs being Transmittable and an HS-DPCCH being Transmitted

A method of allocating I/Q channels and OVSF codes for a DPCCH, a DPDCH, and an HS-DPCCH according to the current standard are illustrated in Table 3.

TABLE 3

| Channel | Allocation |
| --- | --- |
| DPCCH | (Q, 256, 0) |
| DPDCH | (I, SF, SF/4) |
| HS-DPCCH | (Q, 256, 64) |

A method of allocating I/Q channels and OVSF codes for an E-DPCCH and E-DPDCHs in the present invention considering compatibility with the current standard of Table 3 is illustrated in Table 4.

TABLE 4

| Channel | Allocation |
| --- | --- |
| E-DPCCH | (I, $SF_{E-DPCCH}$, 1) |
| E-DPDCH1, E-DPDCH2, | (Q, SF, SF/4 + SF/2), (I, 4, 3) |
| E-DPDCH3, E-DPDCH4 | (Q, 4, 2), (I, 4, 2) |

Here, 8, 16, 32, 64, 128 and 256 are available for the $SF_{E-DPCCH}$ for the E-DPCCH, and 4, 8, 16, 32, 64, 128, 256 and 512 are available for the $SF_{E-DPDCH}$ for the E-DPDCHs.

In this case, if a maximum of 4 E-DPDCH channels can be transmitted and $SF_{E-DPDCH}$=4 is used, an E-DPDCH1 and an E-DPDCH2 are allocated (Q, 4, 3) and (I, 4, 3), respectively. An E-DPDCH3 is transmitted on a Q channel using an OVSF code (4, 2), and an E-DPDCH4 is transmitted on an I channel using an OVSF code (4, 2).

3. A Maximum of 2 DPDCHs being Transmittable and an HS-DPCCH not being Transmitted A method of allocating I/Q channels and OVSF codes for a DPCCH and DPDCHs according to the current standard is illustrated in Table 5.

TABLE 5

| Channel | Allocation |
| --- | --- |
| DPCCH | (Q, 256, 0) |
| DPDCH1, DPDCH2 | (I, SF, SF/4), (Q, 4, 1) |

A method of allocating I/Q channels and OVSF codes for an E-DPCCH and E-DPDCHs in the present invention considering compatibility with the current standard of Table 5 is illustrated in Table 6.

TABLE 6

| Channel | Allocation |
| --- | --- |
| E-DPCCH | (I, $SF_{E-DPCCH}$, 1) |
| E-DPDCH1, E-DPDCH2, | (Q, SF, SF/4 + SF/2), (I, 4, 3) |
| E-DPDCH3, E-DPDCH4 | (Q, 4, 2), (I, 4, 2) |

Here, 8, 16, 32, 64, 128 and 256 are available for the $SF_{E-DPCCH}$ for the E-DPCCH, and 4, 8, 16, 32, 64, 128, 256 and 512 are available for the $SF_{E-DPDCH}$ for the E-DPDCHs.

In this case, if a maximum of 4 E-DPDCH channels can be transmitted and $SF_{E-DPDCH}$=4 is used, an E-DPDCH1 and an E-DPDCH2 are transmitted using (Q, 4, 3) and (I, 4, 3), respectively. An E-DPDCH3 is transmitted on a Q channel using an OVSF code (4, 2), and an E-DPDCH4 is transmitted on an I channel using an OVSF code (4, 2).

4. A Maximum of 2 DPDCHs being Transmittable and an HS-DPCCH being Transmitted

A method of allocating I/Q channels and OVSF codes for a DPCCH, a DPDCH and an HS-DPCCH according to the current standard is illustrated in Table 7.

TABLE 7

| Channel | Allocation |
| --- | --- |
| DPCCH | (Q, 256, 0) |
| DPDCH | (I, SF, SF/4) |
| HS-DPCCH | (Q, 256, 64) |

A method of allocating I/Q channels and OVSF codes for an E-DPCCH and E-DPDCHs in the present invention considering compatibility with the current standard of Table 7 is illustrated in Table 8.

TABLE 8

| Channel | Allocation |
| --- | --- |
| E-DPCCH | (Q, $SF_{E-DPCCH}$, $SF_{E-DPCCH}$/8) |
| E-DPDCH1, E-DPDCH2, | (I, SF, SF/4 + SF/2), (Q, 4, 8) |
| E-DPDCH3, E-DPDCH4 | (I, 4, 2), (Q, 4, 2) |

Here, 64, 128 and 256 are available for the $SF_{E-DPCCH}$ for the E-DPCCH, and 4, 8, 16, 32, 64, 128, 256 and 512 are available for the $SF_{E-DPDCH}$ for the E-DPDCHs.

In this case, if a maximum of 4 E-DPDCH channels can be transmitted and SF=4 is used, an E-DPDCH1 and an E-DPDCH2 are allocated (I, 4, 3) and (Q, 4, 3), respectively. An E-DPDCH3 is transmitted on an I channel using an OVSF code (4, 2), and an E-DPDCH4 is transmitted on a Q channel using an OVSF code (4, 2).

5. A Maximum of 3 DPDCHs being Transmittable and an HS-DPCCH not being Transmitted A method of allocating I/Q channels and OVSF codes for a DPCCH and DPDCHs according to the current standard is illustrated in Table 9.

TABLE 9

| Channel | Allocation |
|---|---|
| DPCCH | (Q, 256, 0) |
| DPDCH1, DPDCH2, | (I, SF, SF/4), (Q, 4, 1) |
| DPDCH3 | (I, 4, 3) |

A method of allocating I/Q channels and OVSF codes for an E-DPCCH and E-DPDCHs in the present invention considering compatibility with the current standard of Table 9 is illustrated in Table 10.

TABLE 10

| Channel | Allocation |
|---|---|
| E-DPCCH | (I, $SF_{E-DPCCH}$, 1) |
| E-DPDCH1, E-DPDCH2, | (Q, SF, SF/4 + SF/2), (I, 4, 2) |
| E-DPDCH3 | (Q, 4, 2) |

Here, 8, 16, 32, 64, 128 and 256 are available for the $SF_{E-DPCCH}$ for the E-DPCCH, and 4, 8, 16, 32, 64, 128, 256 and 512 are available for the $SF_{E-DPDCH}$ for the E-DPDCHs.

In this case, if a maximum of 3 E-DPDCH channels can be transmitted and SF=4 is used, an E-DPDCH1 is transmitted on a Q channel using an OVSF code (4, 3). An E-DPDCH2 is transmitted on an I channel using an OVSF code (4, 2), and an E-DPDCH3 is transmitted on the Q channel using an OVSF code (4,2).

6. A Maximum of 3 DPDCHs being Transmittable and an HS-DPCCH being Transmitted A method of allocating I/Q channels and OVSF codes for a DPCCH, DPDCHs and an HS-DPCCH according to the current standard is illustrated in Table 11.

TABLE 11

| Channel | Allocation |
|---|---|
| DPCCH | (Q, 256, 0) |
| DPDCH1, DPDCH2, | (I, SF, SF/4), (Q, 4, 1) |
| DPDCH3 | (I, 4, 3) |
| HS-DPCCH | (Q, 256, 32) |

A method of allocating I/Q channels and OVSF codes for an E-DPCCH and E-DPDCHs in the present invention considering compatibility with the current standard of Table 11 is illustrated in Table 12.

TABLE 12

| Channel | Allocation |
|---|---|
| E-DPCCH | (I, $SF_{E-DPCCH}$, 1) |
| E-DPDCH1, E-DPDCH2, | (Q, SF, SF/4 + SF/2), (I, 4, 2) |
| E-DPDCH3 | (Q, 4, 2) |

Here, 8, 16, 32, 64, 128 and 256 are available for the $SF_{E-DPCCH}$ for the E-DPCCH, and 4, 8, 16, 32, 64, 128, 256 and 512 are available for the $SF_{E-DPDCH}$ for the E-DPDCHs.

In this case, if a maximum of 3 E-DPDCH channels can be transmitted and SF=4 is used, an E-DPDCH1 is transmitted on a Q channel using an OVSF code (4, 3). An E-DPDCH2 is transmitted on an I channel using an OVSF code (4, 2), and an E-DPDCH3 is transmitted on the Q channel using an OVSF code (4, 2).

7. A Maximum of 4 DPDCHs being Transmittable and an HS-DPCCH not being Transmitted A method of allocating I/Q channels and OVSF codes for a DPCCH and DPDCHs according to the current standard is illustrated in Table 13.

TABLE 13

| Channel | Allocation |
|---|---|
| DPCCH | (Q, 256, 0) |
| DPDCH1, DPDCH2, | (I, SF, SF/4), (Q, 4, 1) |
| DPDCH3, DPDCH4 | (I, 4, 3), (Q, 4, 3) |

A method of allocating I/Q channels and OVSF codes for an E-DPCCH and E-DPDCHs in the present invention considering compatibility with the current standard of Table 13 is illustrated in Table 14.

TABLE 14

| Channel | Allocation |
|---|---|
| E-DPCCH | (I, $SF_{E-DPCCH}$, 1) |
| E-DPDCH1, E-DPDCH2 | (I, SF, SF/2), (Q, 4, 2) |

Here, 8, 16, 32, 64, 128 and 256 are available for the $SF_{E-DPCCH}$ for the E-DPCCH, and 4, 8, 16, 32, 64, 128, 256 and 512 are available for the $SF_{E-DPDCH}$ for the E-DPDCHs.

In this case, if a maximum of 2 E-DPDCH channels can be transmitted and SF=4 is used, an E-DPDCH1 is transmitted on an I channel using an OVSF code (4, 2) and an E-DPDCH2 is transmitted on a Q channel using an OVSF code (4, 2).

8. A Maximum of 4 DPDCHs being Transmittable and an HS-DPCCH being Transmitted A method of allocating I/Q channels and OVSF codes for a DPCCH and DPDCHs according to the current standard is illustrated in Table 15.

TABLE 15

| Channel | Allocation |
|---|---|
| DPCCH | (Q, 256, 0) |
| DPDCH1, DPDCH2, | (I, SF, SF/4), (Q, 4, 1) |
| DPDCH3, DPDCH4 | (I, 4, 3), (Q, 4, 3) |
| HS-DPCCH | (I, 256, 1) |

A method of allocating I/Q channels and OVSF codes for an E-DPCCH and E-DPDCHs in the present invention considering compatibility with the current standard of Table 15 is illustrated in Table 16.

TABLE 16

| Channel | Allocation |
|---|---|
| E-DPCCH | (Q, $SF_{E-DPCCH}$, $SF_{E-DPCCH}$/8) |
| E-DPDCH1, E-DPDCH2 | (I, SF, SF/2), (Q, 4, 2) |

Here, 64, 128 and 256 are available for the $SF_{E-DPCCH}$ for the E-DPCCH, and 4, 8, 16, 32, 64, 128, 256 and 512 are available for the $SF_{E-DPDCH}$ for the E-DPDCHs.

In this case, if a maximum of 2 E-DPDCH channels can be transmitted and SF=4 is used, an E-DPDCH1 is transmitted on an I channel using an OVSF code (4, 2) and an E-DPDCH2 is transmitted on a Q channel using an OVSF code (4, 2).

9. A Maximum of 5 DPDCHs being Transmittable and an HS-DPCCH not being Transmitted A method of allocating I/Q channels and OVSF codes for a DPCCH and DPDCHs according to the current standard is illustrated in Table 17.

TABLE 17

| Channel | Allocation |
|---|---|
| DPCCH | (Q, 256, 0) |
| DPDCH1, DPDCH2, | (I, SF, SF/4), (Q, 4, 1) |
| DPDCH3, DPDCH4, | (I, 4, 3), (Q, 4, 3) |
| DPDCH5 | (I, 4, 2) |

A method of allocating I/Q channels and OVSF codes for an E-DPCCH and E-DPDCHs in the present invention considering compatibility with the current standard of Table 17 is illustrated in Table 18.

TABLE 18

| Channel | Allocation |
|---|---|
| E-DPCCH | (I, $SF_{E\text{-}DPCCH}$, 1) |
| E-DPDCH1 | (Q, SF, SF/2) |

Here, 8, 16, 32, 64, 128 and 256 are available for the $SF_{E\text{-}DPCCH}$ for the E-DPCCH, and 8, 16, 32, 64, 128, 256 and 512 are available for the $SF_{E\text{-}DPDCH}$ for the E-DPDCHs. A maximum of only one E-DPDCH can be transmitted. An E-DPDCH1 is transmitted on a Q channel using an OVSF code (4, 2).

10. A Maximum of 5 DPDCHs being Transmittable and an HS-DPCCH being Transmitted A method of allocating I/Q channels and OVSF codes for a DPCCH and DPDCHs according to the current standard is illustrated in Table 19.

TABLE 19

| Channel | Allocation |
|---|---|
| DPCCH | (Q, 256, 0) |
| DPDCH1, DPDCH2, | (I, SF, SF/4), (Q, 4, 1) |
| DPDCH3, DPDCH4, | (I, 4, 3), (Q, 4, 3) |
| DPDCH5 | (I, 4, 2) |
| HS-DPCCH | (Q, 256, 32) |

A method of allocating I/Q channels and OVSF codes for an E-DPCCH and E-DPDCHs in the present invention considering compatibility with the current standard of Table 19 is illustrated in Table 20.

TABLE 20

| Channel | Allocation |
|---|---|
| E-DPCCH | (I, $SF_{E\text{-}DPCCH}$, 1) |
| E-DPDCH1, E-DPDCH2 | (Q, SF, SF/2) |

Here, 8, 16, 32, 64, 128 and 256 are available for the $SF_{E\text{-}DPCCH}$ for the E-DPCCH, and a maximum of only one E-DPDCH can be transmitted. An E-DPDCH1 is transmitted on a Q channel using an OVSF code (4, 2).

Seventh Embodiment

Compared with the sixth embodiment, a seventh embodiment presents an allocation rule which is similar in packet back-off required in an RF power amplifier but simpler in implementation. A method of allocating I/Q channels and OVSF codes for an E-DPCCH and E-DPDCHs is determined based on the maximum number of transmittable DPDCHs and transmission/non-transmission of an HS-DPCCH, and a basic rule thereof is as follows:

E-DPCCH: If the maximum number of transmittable DPDCHs is 2 or 4 and an HS-DPCCH is allocated (I, 256, 1), it uses (Q, $SF_{E\text{-}DPCCH}$, $SF_{E\text{-}DPCCH}$/8) and in other cases, it uses (I, $SF_{E\text{-}DPCCH}$, 1).

E-DPDCH: When several DPDCH channels are transmitted, the DPDCHs use OVSF codes in order of (I, 4, 1), (Q, 4, 1), (I, 4, 3), (Q, 4, 3), (I, 4, 2) and (Q, 4, 2) according to a data rate. Therefore, the E-DPDCHs additionally use the remaining codes except the codes set for DPDCH transmission among the six codes in the arranged order according to an EUDCH packet data rate.

In a stand-alone case where only an EUDCH is transmitted, an HSDPA uses an OVSF code (256, 1) on an I channel, and in a case where a DPDCH is set, the HSDPA follows the Rel-5 standard.

Preferably, I/Q channels and OVSF codes are allocated for the E-DPCCH and E-DPDCHs in the foregoing manner in terms of a PAPR.

1. HS-DPCCH being not Set and an EUDCH Stand-Alone

An E-DPCCH always uses (I, $SF_{E\text{-}DPCCH}$, 1). Here, 8, 16, 32, 64, 128 and 256 are available for the $SF_{E\text{-}DPCCH}$.

As illustrated in Table 21, the E-DPDCHs are allocated I/Q channels and OVSF codes according to the maximum number of transmittable DPDCHs.

TABLE 21

| Max No of Transmittable DPDCHs | Max No of Transmittable E-DPDCHs | E-DPDCH Allocation Order |
|---|---|---|
| 0 | 6 | (I, SF, SF/4), (Q, 4, 1), (I, 4, 3), (Q, 4, 3), (I, 4, 2), (Q, 4, 2) |
| 1 | 5 | (Q, SF, SF/4), (I, 4, 3), (Q, 4, 3), (I, 4, 2), (Q, 4, 2) |
| 2 | 4 | (I, SF, SF/2 + SF/4), (Q, 4, 3), (I, 4, 2), (Q, 4, 2) |
| 3 | 3 | (Q, SF, SF/2 + SF/4), (I, 4, 2) (Q, 4, 2) |
| 4 | 2 | (I, SF, SF/2), (Q, 4, 2) |
| 5 | 1 | (Q, SF, SF/2) |

In Table 21, 4, 8, 16, 32, 64, 128, 256 and 512 are available for the SF. If the maximum number of transmittable DPDCHs is 0, E-DPDCHs transmitting EUDCH data can use a maximum of 6 codes.

For example, when all of the six channels are used according to the EUDCH data rate, an E-DPDCH1 is transmitted on an I channel using an OVSF code (4, 1), and an E-DPDCH2 is transmitted on a Q channel using an OVSF code (4, 1). An E-DPDCH3 is transmitted on the I channel using an OVSF code (4, 3), and an E-DPDCH4 is transmitted on the Q channel using an OVSF code (4, 3). An E-DPDCH5 is transmitted on the I channel using an OVSF code (4, 2), and an E-DPDCH6 is transmitted on the Q channel using an OVSF code (4, 2).

As another example, if the maximum number of transmittable DPDCHs is 4 in Table 21, E-DPDCHs for transmitting EUDCH data can use a maximum of 2 codes. For the E-DPDCHs, an E-DPDCH1 is transmitted on an I channel using an OVSF code (SF, SF/2), and an additionally allocated E-DPDCH2 is transmitted on a Q channel using an OVSF code (4, 2).

2. A Maximum of I DPDCH being Transmittable and an HS-DPCCH being Allocated (Q, 256, 64)

An E-DPCCH always uses (I, $SF_{E\text{-}DPCCH}$, 1). Here, 8, 16, 32, 64, 128 and 256 are available for the $SF_{E\text{-}DPCCH}$.

The E-DPDCHs are sequentially allocated four OVSF codes (I, SF, SF/2+SF/4), (Q, 4, 3), (I, 4, 2) and (Q, 4, 2) according to an EUDCH data rate. Here, 4, 8, 16, 32, 64, 128, 256 and 512 are available for the SF. Because the HS-DPCCH is allocated (Q, 256, 64) on the Q channel, the OVSF code (4, 1) is hardly used for an E-DPDCH.

3. A Maximum of 2 DPDCHs being Transmittable and an HS-DPCCH being Set

As illustrated in Table 22, an E-DPCCH is allocated I/Q channels and OVSF codes according to the maximum number of transmittable DPDCHs.

TABLE 22

| Max No of Transmittable DPDCHs | E-DPCCH Allocation |
|---|---|
| 1, 3, 5 | (I, $SF_{E\text{-}DPCCH}$, 1) |
| 2, 4 | (Q, $SF_{E\text{-}DPCCH}$, $SF_{E\text{-}DPCCH}$/8) |

In this case, if the maximum number of transmittable DPDCHs is 2 or 4 and an HS-DPCCH is allocated (I, 256, 1), an E-DPCCH uses (Q, $SF_{E\text{-}DPCCH}$, $SF_{E\text{-}DPCCH}$/8). Here, 64, 128 and 256 are available for the $SF_{E\text{-}DPCCH}$.

However, the E-DPDCHs are allocated I/Q channels and OVSF codes as illustrated in Table 21 according to the maximum number of transmittable DPDCHs.

Eighth Embodiment

An eighth embodiment has a basic procedure of first allocating an E-DPDCH to a Q channel for an OVSF code having the same index, and additionally allocating an E-DPDCH to an I channel. In this case, codes for the E-DPDCHs are determined according to the maximum number of transmittable DPDCHs and transmission/non-transmission of an HS-DPCCH.

That is, DPDCHs are first allocated to an I channel and E-DPDCHs are first allocated to a Q channel, so that the numbers of DPDCHs and E-DPDCHs transmitted on the I/Q channels can be equal to each other. In order words, when an HS-DPCCH is transmitted on the Q channel using an OVSF code (256, 64) or the number of the DPDCHs is smaller than the maximum number of transmittable DPDCHs, the eighth embodiment can prevent an excessive increase in PAPR due to an excess of DPDCHs and E-DPDCHs over the I channel.

However, when the foregoing OVSF code and I/Q channel allocation rule for E-DPDCHs is used, compared with a DPCCH using an OVSF code (256, 0) on a Q channel, an E-DPDCH is transmitted on an I channel using (SF, 1), thereby minimizing an increase in PAPR. Here, 4, 8, 16, 32, 64 and 128 are available for the SF. In a stand-alone case, an HSDPA uses an OVSF code (256, 1) on an I channel, and in a case where a DPDCH is set, the HSDPA follows the Rel-5 standard. Preferably, OVSF codes are allocated in the foregoing manner in terms of a PAPR.

1. HS-DPCCH not being Set and an EUDCH Stand-Alone

E-DPDCHs are allocated I/Q channels and OVSF codes as illustrated in Table 23 according to the maximum number of transmittable DPDCHs.

TABLE 23

| Max No of Transmittable DPDCHs | Max No of Transmittable E-DPDCHs | E-DPDCH Allocation Order |
|---|---|---|
| 0 | 6 | (Q, SF, SF/4), (I, 4, 1), (Q, 4, 3), (I, 4, 3), (Q, 4, 2), (I, 4, 2) |
| 1 | 5 | (Q, SF, SF/4), (Q, 4, 3), (I, 4, 3), (Q, 4, 2), (I, 4, 2) |
| 2 | 4 | (Q, SF, SF/2 + SF/4), (I, 4, 3), (Q, 4, 2), (I, 4, 2) |
| 3 | 3 | (Q, SF, SF/2 + SF/4), (Q, 4, 2) (I, 4, 2) |
| 4 | 2 | (Q, SF, SF/2), (I, 4, 2) |
| 5 | 1 | (I, SF, SF/2) |

In Table 23, 4, 8, 16, 32, 64, 128, 256 and 512 are available for the SF. In Table 23, if the maximum number of transmittable DPDCHs is 0, a maximum of 6 E-DPDCH channels can be transmitted. In this case, OVSF codes are used in order of (Q, SF, SF/4), (I, 4, 1), (Q, 4, 3), (I, 4, 3), (Q, 4, 2) and (I, 4, 2) according to the number of E-DPDCH channels being transmitted.

However, if the maximum number of transmittable DPDCHs is 1, a maximum of 5 codes can be used for E-DPDCH channels transmitting EUDCH data, so that a maximum of 5 E-DPDCH channels can be transmitted. In this case, OVSF codes are used in order of (Q, SF, SF/4), (Q, 4, 3), (I, 4, 3), (Q, 4, 2) and (I, 4, 2) according to the number of E-DPDCH channels being transmitted.

As another example, if the maximum number of transmittable DPDCHs is 4 in Table 23, a maximum of 2 codes can be used for E-DPDCHs. In this case, when only one E-DPDCH is transmitted, the E-DPDCH is transmitted on a Q channel using an OVSF code (SF, SF/2), and an E-DPDCH additionally allocated when necessary is transmitted on an I channel using an OVSF code (4, 2).

2. A Maximum of I DPDCH being Transmittable and an HS-DPCCH being Allocated (Q. 256, 64)

E-DPDCHs are sequentially allocated four OVSF codes (Q, SF, SF/2+SF/4), (I, 4, 3), (Q, 4, 2) and (I, 4, 2) according to an EUDCH data rate. Here, 4, 8, 16, 32, 64, 128, 256 and 512 are available for the SF.

For example, when only one E-DPDCH is transmitted, the E-DPDCH is transmitted on a Q channel using an OVSF code (SF, SF/2+SF/4). This is to prevent an excessive increase in PAPR due to an excess of physical data channels over one of the I and Q channels. Therefore, DPDCHs are transmitted on the I channel and E-DPDCHs are transmitted on the Q channel, so that the number of physical data channels transmitted on the I channel is equal to the number of physical data channels transmitted on the Q channel, thereby preventing an increase in PAPR.

3. A Maximum of 2 DPDCHs being Transmittable and an HS-DPCCH being Set

The same code allocation rule as that illustrated in Table 23 is used.

Ninth Embodiment

When several E-DPDCH physical channels are transmitted, SF=2 OVSF codes are used for E-DPDCHs only in the following case in order to further reduce a PAPR.

For example, when (I, 4, 3) and (I, 4, 2) are simultaneously allocated to E-DPDCHs for multicode transmission on the E-DPDCHs, the E-DPDCHs are transmitted using (I, 2, 1) instead of the foregoing two codes. That is, for the case where E-DPDCHs are transmitted on the I channel using both of the OVSF codes (4, 3) and (4, 2), the E-DPDCHs are transmitted on the I channel using the OVSF code (2, 1).

Likewise, for the case where OVSF codes (4, 3) and (4, 2) are simultaneously allocated to E-DPDCHs on a Q channel, the E-DPDCHs are transmitted on the Q channel using an OVSF code (2, 1). That is, the E-DPDCHs are transmitted using (Q, 2, 1).

The following tenth embodiment provides a method of additionally using possible codes generated from an OVSF code (4, 1), including a Q channel OVSF code (256, 64) used by an HS-DPCCH channel, for E-DPDCHs. In addition, the tenth embodiment provides a method of additionally using codes allocated to DPDCHs, for E-DPDCHs.

Tenth Embodiment

An OVSF code (Q, 256, 64) used for an HS-DPCCH is used for an additional E-DPDCH. That is, an HS-DPCCH uses an OVSF code (256, 32) on a Q channel, thereby guaranteeing an EUDCH data rate. In this embodiment, OVSF code and I/Q channel allocation methods for E-DPDCHs are summarized as follows.

1. Two or Fewer E-DPDCH Channels being Transmitted
The methods of the first to fifth embodiments are used.

2. Three E-DPDCH Channels being Transmitted
An E-DPDCH1 and an E-DPDCH2 are allocated to I and Q channels, respectively, using an OVSF code (2, 1).

An E-DPDCH3 is allocated to the Q channel using an OVSF code (4, 1). In this case, data transmitted over the E-DPDCH3 undergoes QPSK modulation.

In addition, methods of using OVSF codes allocated to DPDCHs, for E-DPDCHs, are as follows.

1. Three or Fewer E-DPDCH Channels being Transmitted
The methods of the sixth to ninth embodiments are used.

2. Four or Fewer E-DPDCH Channels being Transmitted
When no DPDCH is transmitted, a fourth E-DPDCH is transmitted on an I channel using an OVSF code (4, 1).

As described above, the present invention provides an OVSF code and I/Q channel allocation method optimized for E-DPDCHs and an E-DPCCH for EUDCH service, while maintaining backward compatibility with DPDCHs and a DPCCH which are uplink physical channels, in a method for allocating OVSF codes and I/Q channels to uplink physical channels. In addition, the present invention provides an HS-DPCCH channel and an OVSF code which are different from those defined in the existing Rel-5 standard in order to increase a maximum EUDCH data rate, and an OVSF code and I/Q channel allocation method optimized for E-DPDCHs and an E-DPCCH for the EUDCH service for the foregoing case.

Therefore, the present invention can minimize a PARP increase during packet data transmission for the EUDCH service and minimize a transmission error of EUDCH packet data, thereby contributing to an increase in EUDCH service capacity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting enhanced packet data in a mobile communication system, the method comprising the steps of:

generating a first enhanced dedicated physical data channel (E-DPDCH) through an in-phase (I) channel and a second E-DPDCH through a quadrature-phase (Q) channel if high speed downlink packet access (HSDPA) is set, and generating the first E-DPDCH through the Q channel and the second E-DPDCH through the I channel if HSDPA is not set;

generating an enhanced dedicated physical control channel (E-DPCCH) using the I channel; and summing up the E-DPDCHs and the E-DPCCH before transmission.

2. The method of claim 1, wherein the E-DPCCH is spread with an orthogonal variable spreading factor (OVSF) code (256, 1) on the I channel before being transmitted.

3. The method of claim 1, wherein if one dedicated physical data channel (DPDCH) is set up, a high speed-downlink physical control channel (HS-DPCCH) is allocated to an OVSF code (256, 64) on the Q channel.

4. The method of claim 1, wherein if one dedicated physical data channel (DPDCH) is set up and if a spreading factor of the E-DPDCH is denoted by $SF_{E\text{-}DPDCH}$, an OVSF code $(SF_{E\text{-}DPDCH}, SF_{E\text{-}DPDCH}/2)$ is allocated.

5. The method of claim 4, further comprising the step of, if $SF_{E\text{-}DPDCH}$ is 2 and two E-DPDCHs are simultaneously transmitted, generating the first E-DPDCH and the second E-DPDCH which are spread with an OVSF code (2, 1) on the I channel and the Q channel, respectively.

6. The method of claim 4, further comprising the step of, if the DPDCH is not transmitted, generating third and fourth E-DPDCHs using an OVSF code (4, 1) on the I channel and the Q channel, respectively.

7. An apparatus for transmitting an enhanced packet data service in a mobile communication system, the apparatus comprising:

a controller for allocating a first enhanced dedicated physical data channel (E-DPDCH) to an in-phase (I) channel and a second E-DPDCH to a quadrature-phase (Q) channel if high speed downlink packet access (HSDPA) is set, and allocating the first E-DPDCH to the Q channel, the second E-DPDCH to the I channel if HSDPA is not set, and an enhanced dedicated physical control channel (E-DPCCH) to the I channel;

a spreader for spreading the E-DPDCHs and the E-DPCCH according to a control signal from the controller;

a summer for summing up the spread E-DPDCHs and E-DPCCH; and a transmitter for transmitting the summed signal.

8. The apparatus of claim 7, wherein the controller allocates the E-DPCCH to an orthogonal variable spreading factor (OVSF) code (256, 1) on the I channel.

9. The apparatus of claim 7, wherein if one dedicated physical data channel (DPDCH) is set up, the controller allocates a high speed downlink physical control channel (HS-DPCCH) to an OVSF code (256, 64) on the Q channel.

10. The apparatus of claim 7, wherein if one dedicated physical data channel (DPDCH) is set up, the controller allocates the E-DPDCH to an OVSF code $(SF_{E\text{-}DPDCH}, SF_{E\text{-}DPDCH}/2)$, where $SF_{E\text{-}DPDCH}$ denotes a spreading factor of the E-DPDCH.

11. The apparatus of claim 10, wherein if $SF_{E\text{-}DPDCH}$ is 2 and two E-DPDCHs are simultaneously transmitted, the controller allocates the first E-DPDCH and the second E-DPDCH to an OVSF code (2, 1) on the I channel and the Q channel, respectively.

12. The apparatus of claim 10, wherein if the DPDCH is not transmitted, the controller allocates third and fourth E-DPDCHs to an OVSF code (4, 1) on the I channel and the Q channel, respectively.

\* \* \* \* \*

UNITED STATES PATENT AND TRADEMARK OFFICE
CERTIFICATE OF CORRECTION

PATENT NO. : 7,639,650 B2 Page 1 of 1
APPLICATION NO. : 11/057618
DATED : December 29, 2009
INVENTOR(S) : Cho et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1319 days.

Signed and Sealed this

Ninth Day of November, 2010

David J. Kappos
*Director of the United States Patent and Trademark Office*